No. 731,720. PATENTED JUNE 23, 1903.
J. P. THOMAS.
ROLLER BEARING.
APPLICATION FILED NOV. 12, 1900.
NO MODEL. 2 SHEETS—SHEET 2.
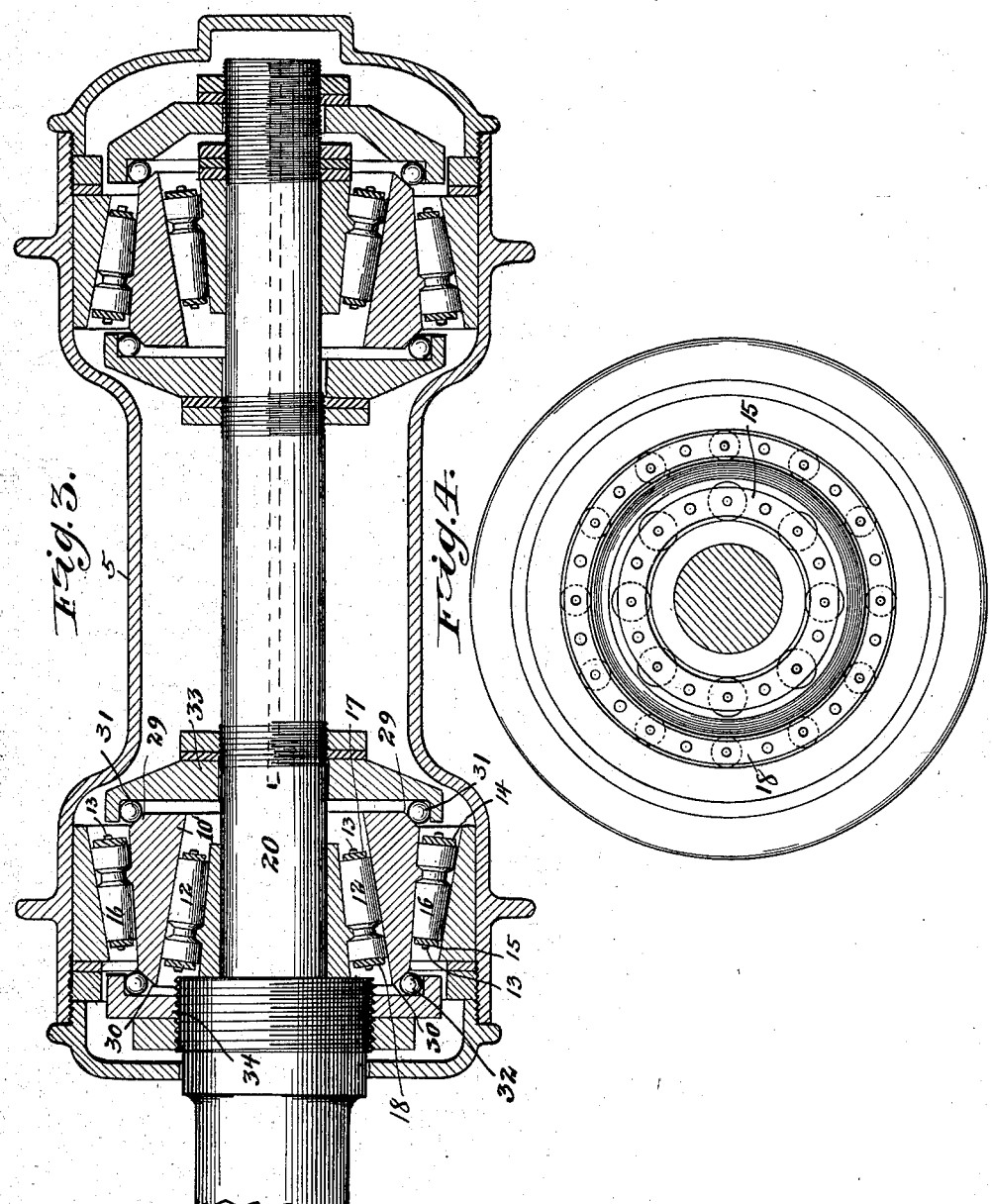

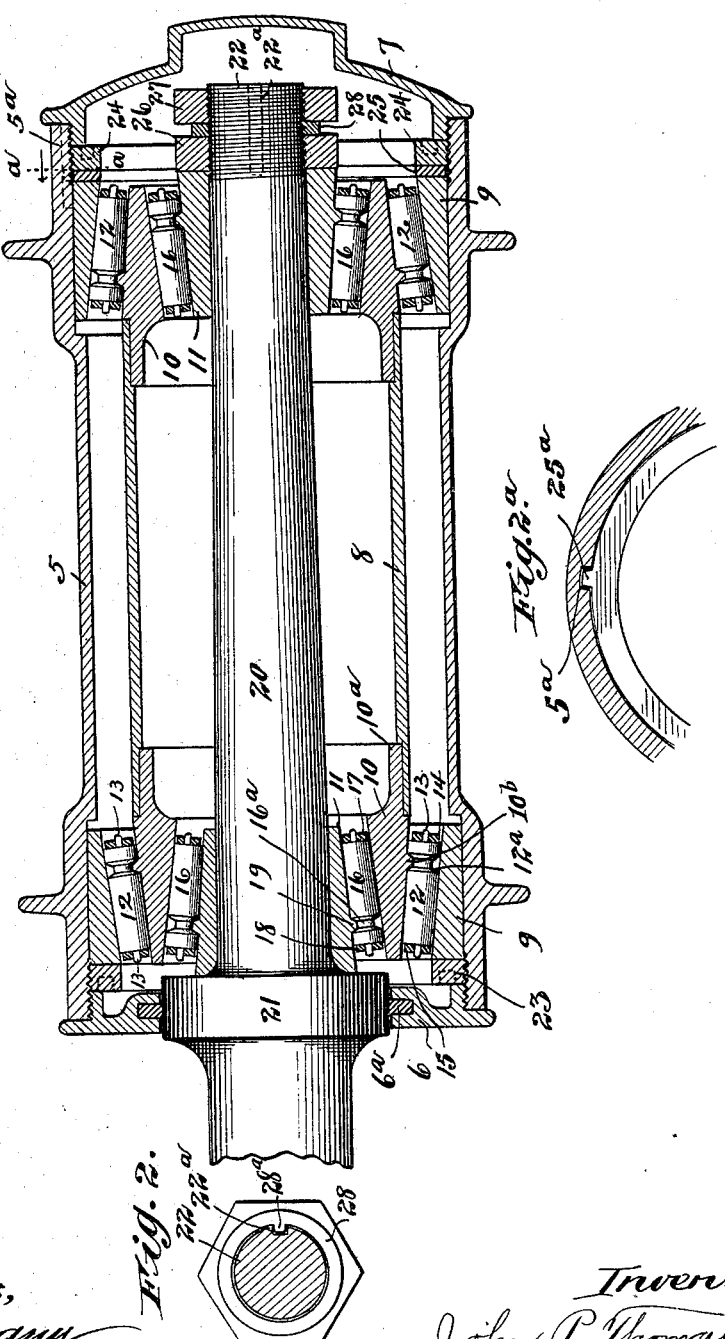

No. 731,720. Patented June 23, 1903.

UNITED STATES PATENT OFFICE.

JOHN P. THOMAS, OF CHICAGO, ILLINOIS.

ROLLER-BEARING.

SPECIFICATION forming part of Letters Patent No. 731,720, dated June 23, 1903.

Application filed November 12, 1900. Serial No. 36,240. (No model.)

*To all whom it may concern:*

Be it known that I, JOHN P. THOMAS, of Chicago, county of Cook, and State of Illinois, have invented certain new and useful Improvements in Roller-Bearings, of which the following is a specification.

My invention relates to certain improvements in roller-bearings, and is particularly applicable to vehicle-hubs, although the same may be applied to other shaft-bearings, such as axle, cylinder, and other bearings.

In the accompanying drawings, Figure 1 is a longitudinal sectional elevation of a hub, the axle-journal and the rollers being shown in elevation. Fig. 2 shows a washer and lock-nut for confining the hub upon the journal and showing the latter in section. Fig. 2$^a$ is a sectional detail on line $a$ $a$ of Fig. 1. Fig. 3 is a view similar to Fig. 1, but showing a modified form of construction; and Fig. 4 is an end view with the cap removed and the axle in section, showing particularly the cage-rings in which the rollers are mounted.

First describing the construction shown in Figs. 1 and 2, let 5 represent the outer casing or shell of the bearing, which in the form shown constitutes a vehicle-hub. The ends of this hub or shell are threaded to receive the threaded end caps 6 and 7, respectively. Arranged within and concentrically to the casing or hub 5 is a sleeve 8, and at the respective ends of the hub or casing are concentrically arranged the cylindrical bearing-rings 9, 10, and 11. The opposing surfaces of rings 9 and 10 are inclined to the axis of the shell and have a slight taper, and between them is located an outer series of rollers 12, said rollers being, preferably, of slightly tapering form and having pins or gudgeons 13 at their ends entering apertures in the cage-rings 14 15. The ring 10 is provided with a circumferential flange or rib 10$^b$, and the rollers 12 are grooved, as shown at 12$^a$, to receive the rib. The opposing surfaces of the rings 10 and 11 are likewise inclined to the axis of the shell, but inclined in the reverse direction from that of the bearing-surfaces for the rollers 12. Between the bearing-surfaces of the rings 10 and 11 is located a second or inner series of rollers 16, mounted in cage-rings 17 18, and similarly the ring 11 has a rib 19, which engages groove 16$^a$ in the roller 16.

The construction and arrangement of the cage-rings 14 15 and 17 18 and the peculiar manner in which they coöperate with the rollers and bearing-rings is a feature of importance. The provision of the reduced bearings or gudgeons 13 upon the ends of the rollers arranged to engage bearing-apertures formed in the respective cage-rings and conforming to the gudgeons and whereby the cage-rings not only serve to hold the rollers in accurate alinement with the axis of the journal, but also are themselves supported and carried entirely free from the relatively fixed bearing-rings, is a feature of great importance. A construction of this character obviously reduces the frictional resistance between the rollers and caging device to a minimum, entirely avoids friction between the cage-ring and the bearing-rings or adjacent parts, uniforms the inequalities of speed which may exist between the different rollers, and obviously holds the rollers in most accurate and perfect relation to the bearing, as well as facilitating the assembling and removal of its set of rollers.

While I have shown the raceways for the roller elements as both inclined from the axis of the journal-box or shell and reversely with reference to each other, yet for the broader purposes of my invention the bearing-surfaces of said raceways may lie parallel with said main axis.

The axle 20 has the usual shoulder 21 and outer threaded end 22, and the annular cap 6 encircles the shoulder 21 and is provided with a packing-ring 6$^a$, bearing thereon, to exclude dust. The inner end of said annular cap 6 bears against a threaded follower 23, which in turn contacts with the end of the cone-ring 9, while the end of the cone-ring 11 has abutment upon the shoulder 21. The intermediate cone-ring 10 has a reduced portion 10$^a$, over which the end of the sleeve 8 slips. The cone-rings, with their rollers, are duplicated at each end of the hub, and the sleeve 8 connects the intermediate cone-rings of the bearing. 24 is a threaded follower-ring, and 25 a washer interposed between said follower and the end of the cone-ring 9, located at the outer end of the hub, Fig. 2ª. The washer 25 has the key 25ª, adapted to the groove 5ª of the shell 5. The cone-ring 11 at the outer end of the bearing is confined in place by the threaded nuts 26 27, the latter constituting a lock-nut, and a washer 28, (shown in plan view in Fig. 2,) having a key 28ª, adapted to a groove 22ª in the axle 22, is interposed between the nuts 26 27.

In use the construction above described, with the parts properly adjusted, affords a roller-bearing in which both ends of the hub are properly balanced. The two series of rollers will travel on the cones in the same direction and at approximately the same rate of speed. Since the individual rollers of each series are connected by the cage-rings, said rings also travel around the axle, and the friction is reduced by this rolling contact, while the points of contact are double in number those of a single roller-bearing, and there is a saving of approximately fifty percentum of power, which makes this bearing particularly serviceable in transporting heavy loads.

When it becomes necessary to adjust the bearings to take up wear, by the removal of a cap-nut 7 and turning up the adjusting-nuts 26 27 the inner cone-ring 11 at the outer end of the axle is forced inwardly. In like manner by the turning of the threaded follower 24 cone-ring 9 at the outer end of the axle is likewise moved inwardly. Obviously the adjustment inwardly of the outer cone-bearings 9 and 11 has the effect of moving the inner sleeve 8 inwardly, and this endwise movement serves, in effect, to adjust the bearing at the inner end of the journal.

In the construction shown in Fig. 3 the internal sleeve 8 is omitted and the bearing at each end is adjusted independently of the other. The bearing-rings, cage-rings, and rollers are of substantially the same construction as that hereinbefore described, except that the opposite ends of the intermediate bearing-rings 10 are beveled or inclined at 29 30 to provide raceways for the series of balls 31 32 in conjunction with the flanged annular confining-rings 33 34, which are threaded upon the journal at the respective ends of said cone-rings. In this construction I have shown roller elements 12 and 16 with a more pronounced taper than in the construction previously described, and I have also shown other slight modifications necessary to the changed construction. The principle of operation is the same in both constructions, and the intermediate cone-rings at the respective ends of the bearing are, in effect, connected by the confining-rings and axle the same as by the sleeve of the first-described construction.

The purpose of the sleeve and of the confining-rings and balls is alike to maintain the intermediate cone-rings in proper relation to the inner and outer cone-rings and the interposed rollers, so as to prevent binding. A double roller-bearing would be inefficient unless adequate means were provided for maintaining the intermediate cone-rings in proper relation to the bearing-surfaces of the external and internal cone-rings, and while I prefer to employ the internal sleeve, and have shown herein but one equivalent therefor, I do not wish to be considered as limiting my invention to the means for maintaining the intermediate cones in position.

In Fig. 4 the manner of assembling the parts is indicated, the cage-rings, series of rollers, and cones being marked to indicate their relative positions.

The invention hereinabove described affords a superior bearing, which will be found well suited not only to the lighter class of vehicles, but also to the heavier kinds—such as automobiles, army-wagons, farm machinery, street and railway cars, and other vehicles intended for the transportation of heavy loads—and generally for shaft and cylinder bearing. I consider it important that the bearings be separated from each other at the respective ends of the journal, and it is also important that the antifriction devices themselves shall have considerable contact-surface, and these features are therefore made the subject of specific claims.

I claim as my invention—

1. In a roller-bearing, the combination with an outer shell or casing, of concentrically-arranged bearing-rings therein located at opposite ends of the bearing, an outer and an inner series of rollers interposed between said bearing-rings, the bearing-surfaces for the inner and outer series of rollers being reversely inclined with reference to each other, substantially as described.

2. In a roller-bearing, the combination with an outer shell or casing, of bearing-rings arranged at opposite ends of the bearing within the shell or casing and concentrically to each other, said bearing-rings having bearing-surfaces reversely inclined with reference to each other, conical rollers interposed between the bearing-rings, and means for preventing endwise movement of the rollers, substantially as described.

3. In a roller-bearing, the combination with an outer shell, or casing of an intermediate sleeve, conical bearing members rigidly connected with each end of said sleeve, outer and inner concentrically-disposed bearing-rings having surfaces opposed to the respective cone-surfaces of the interposed conical bearing members, elongated rollers arranged between the interposed conical members and the outer and inner bearing-rings, cage-rings mounted upon and traveling with the sets of rollers and holding the latter in relatively fixed relation to each other, and means for holding and adjusting both the outer and inner bearing-rings longitudinally of the bearing and independently of each other, substantially as described.

4. In a roller-bearing, the combination with an outer shell or casing, of concentrically-disposed bearing-rings having reversely-arranged conical bearing-surfaces within said shell or bearing near its end, and two series of rollers located between said bearing-rings, and cage-rings in which the series of rollers are mounted, substantially as described.

5. In a roller-bearing, the combination of outer and inner concentrically-arranged bearing-rings and an intermediate bearing-ring, both the outer and inner bearing-rings having bearing-surfaces inclined to the axis of the journal, and inclined oppositely with relation to each other, and an outer and inner series of roller-shaped elements interposed between the intermediate and outer and inner bearing-rings, said bearing-rings and roller elements being provided with interengaging shoulders, whereby the roller elements are confined against axial movement, substantially as described.

6. In a roller-bearing, the combination of outer and inner concentrically-arranged bearing-rings and an intermediate bearing-ring, both the outer and inner bearing-rings having bearing-surfaces inclined to the axis of the journal, and inclined oppositely with relation to each other, and an outer and inner series of roller-shaped elements interposed between the intermediate and outer and inner bearing-rings, each of the roller elements being provided with a circumferential groove, and one of the bearing members between which said elements are interposed being provided with a circumferential rib engaging said groove, substantially as described.

7. In a roller-bearing, the combination of outer and inner concentrically-arranged bearing-rings and an intermediate bearing-ring, both the outer and inner bearing-rings having bearing-surfaces inclined to the axis of the journal, and inclined oppositely with relation to each other, and an outer and inner series of roller-shaped elements interposed between the intermediate and outer and inner bearing-rings, each of the roller elements being provided with a circumferential groove, and one of the bearing members between which said elements are interposed being provided with a circumferential rib engaging said groove, and means for adjusting one of said bearing-rings longitudinally of the journal, as and for the purposes set forth.

8. In a roller-bearing, the combination of outer and inner concentrically-arranged bearing-rings and an intermediate bearing-ring, both the outer and inner bearing-rings having bearing-surfaces inclined to the axis of the journal, and inclined oppositely with relation to each other, and an outer and inner series of roller-shaped elements interposed between the intermediate and outer and inner bearing-rings, each of the roller elements being provided with a circumferential groove, and one of the bearing members between which said elements are interposed being provided with a circumferential rib engaging said groove, and means for adjusting two of said bearing-rings longitudinally of the journal, as and for the purposes set forth.

9. In a roller-bearing, the combination of a pair of inner conical bearing-rings arranged at longitudinally-separated points and with their smaller ends toward each other, each provided with a circumferential rib, an outer shell inclosing both of said inner bearing-rings and provided upon its interior, radially opposite the latter, with inwardly-facing bearing-rings having conical faces inclined oppositely with relation to the inner bearing-rings, a pair of intermediate bearing-rings interposed between said outer and inner rings at the respective ends of the bearing, and each of said rings provided with a circumferential rib, outer and inner series of roller elements interposed between said intermediate bearing-rings and the outer and inner rings, each of said roller elements having a circumferential groove engaged with the corresponding rib of the bearing-ring, and means for adjusting said outer and inner bearing-rings longitudinally, as and for the purposes set forth.

10. In a roller-bearing, the combination of outer and inner concentric bearing-rings having reversely-arranged opposing conical bearing-surfaces and reversely-arranged conical bearing-rollers adapted to said surfaces, said rollers having reduced portions affording gudgeons, cage-rings having apertures to receive said gudgeons, and said cage-rings being adapted to travel with said rollers out of contact with the fixed portions of the bearings, substantially as described.

11. In a roller-bearing, the combination of outer and inner concentrically-arranged bearing-rings and an intermediate bearing-ring, both the outer and inner bearing-rings having bearing-surfaces inclined to the axis of the journal and inclined oppositely with reference to each other, and an outer and an inner series of roller-shaped elements, cage-rings connecting the members of each series of roller elements and constructed to travel therewith and out of contact with the fixed portions of the bearings, substantially as described.

JOHN P. THOMAS.

Witnesses:
C. C. LINTHICUM,
ADA H. BARNES.